(12) United States Patent
Masuda et al.

(10) Patent No.: US 10,089,200 B2
(45) Date of Patent: Oct. 2, 2018

(54) COMPUTER APPARATUS AND COMPUTER MECHANISM

(71) Applicant: MITSUBISHI ELECTRIC CORPORATION, Tokyo (JP)

(72) Inventors: Hiroki Masuda, Tokyo (JP); Atsushi Settsu, Tokyo (JP); Shinichi Ochiai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 107 days.

(21) Appl. No.: 15/108,995

(22) PCT Filed: Mar. 7, 2014

(86) PCT No.: PCT/JP2014/055969
§ 371 (c)(1),
(2) Date: Jun. 29, 2016

(87) PCT Pub. No.: WO2015/132953
PCT Pub. Date: Sep. 11, 2015

(65) Prior Publication Data
US 2016/0321149 A1 Nov. 3, 2016

(51) Int. Cl.
*G06F 11/20* (2006.01)
*G06F 9/46* (2006.01)

(52) U.S. Cl.
CPC ............ *G06F 11/2033* (2013.01); *G06F 9/46* (2013.01); *G06F 11/2005* (2013.01); *G06F 11/2007* (2013.01); *G06F 11/2025* (2013.01); *G06F 11/2038* (2013.01); *G06F 11/2048* (2013.01); *G06F 2201/805* (2013.01)

(58) Field of Classification Search
CPC ............................ G06F 11/20; G06F 11/2033
USPC ......................................................... 714/4.11
See application file for complete search history.

(56) References Cited

U.S. PATENT DOCUMENTS

| 7,213,246 | B1 * | 5/2007 | van Rietschote ... G06F 11/1482 707/999.202 |
| 2004/0003319 | A1 | 1/2004 | Ukai et al. |
| 2005/0081122 | A1 * | 4/2005 | Hiramatsu .......... G06F 11/2038 714/48 |
| 2006/0174087 | A1 | 8/2006 | Hashimoto et al. |
| 2008/0215793 | A1 | 9/2008 | Hashimoto et al. |
| 2009/0235249 | A1 | 9/2009 | Kobayashi et al. |
| 2010/0275058 | A1 | 10/2010 | Hashimoto et al. |

(Continued)

FOREIGN PATENT DOCUMENTS

| JP | 2004-30363 A | 1/2004 |
| JP | 2005-56241 A | 3/2005 |

(Continued)

*Primary Examiner* — Kamini B Patel
(74) *Attorney, Agent, or Firm* — Birch, Stewart, Kolasch & Birch, LLP

(57) ABSTRACT

In a computer apparatus (100), an output management unit (200) determines for each data processing system configured with an OS (160), an application (170), and a management unit (180), depending on the state of the each processing system, whether or not a communication between each data processing system and a device is permitted.

Further, the output management unit (200) controls for each data processing system the communication between each data processing system and the device in accordance with a determination result.

8 Claims, 8 Drawing Sheets

(56) References Cited

U.S. PATENT DOCUMENTS

| | | | |
|---|---|---|---|
| 2011/0185357 A1 | 7/2011 | Hashimoto et al. | |
| 2013/0036324 A1 | 2/2013 | Nagasawa | |
| 2013/0275972 A1 | 10/2013 | Sawa et al. | |
| 2014/0059302 A1 | 2/2014 | Hayakawa et al. | |
| 2014/0149985 A1* | 5/2014 | Takeuchi | G06F 9/45558 718/1 |

FOREIGN PATENT DOCUMENTS

| | | |
|---|---|---|
| JP | 2005-115751 A | 4/2005 |
| JP | 2006-209487 A | 8/2006 |
| JP | 2009-187090 A | 8/2009 |
| JP | 2009-217608 A | 9/2009 |
| JP | 2011-186967 A | 9/2011 |
| JP | 2013-37433 A | 2/2013 |
| JP | 2013-84122 A | 2/2013 |
| JP | 2014-41395 A | 3/2014 |

* cited by examiner

Fig. 2

ENTRY NOTIFICATION (COMPUTER→SWITCHING CONTROL APPARATUS)

| F100 | F110 | F120 |
|---|---|---|
| COMPUTER ID | NUMBER OF SYSTEMS | SYSTEM ID (VARIABLE NUMBER) |

EXAMPLES:

| A | 2 SYSTEMS | ID: ABC | ID: DEF | |
|---|---|---|---|---|
| B | 3 SYSTEMS | ID: ABC | ID: DEF | ID: GHI |
| C | 2 SYSTEMS | ID: ABC | ID: GHI | |

SYSTEM ABC IS TRIPLEX SYSTEM
DEF AND GHI ARE DUPLEX SYSTEMS

Fig. 3

| STATE CHANGE NOTIFICATION (COMPUTER → SWITCHING CONTROL APPARATUS) | | | |
|---|---|---|---|
| F200 | F210 | F220 | |
| COMPUTER ID | NUMBER OF NOTIFICATION SYSTEMS | SYSTEM STATE (VARIABLE NUMBER) | |
| | | SYSTEM ID | STATE |
| | | F221 | F222 |

EXAMPLES:

| A | 2 SYSTEMS | ID: ABC STATE: STANDBY | ID: DEF STATE: STANDBY | ← SYSTEMS ABC AND DEF ARE ACTIVATED NORMALLY AND STANDING BY |
| B | 1 SYSTEM | ID: ABC STATE: ABNORMAL | | ← SYSTEM ABC BECAME INTO ABNORMAL STATE |
| C | 2 SYSTEMS | ID: ABC STATE: STANDBY | ID: GHI STATE: ABNORMAL | ← ABC BECAME INTO NORMAL STANDBY STATE, AND GHI BECAME INTO ABNORMAL STATE |

COMPUTER APPARATUS AND COMPUTER MECHANISM

TECHNICAL FIELD

The present invention relates to device management in a computer.

BACKGROUND ART

Due to the spread of a multi-core CPU (Central Processing Unit) and a large capacity memory, a multi-system computer configuration mounting a plurality of data processing systems (hereinafter referred to simply as systems) including an OS (Operating System) and an application program (hereinafter referred to as an application) in one computer has been widely used.

Increased degree of integration of the systems in the computer leads to a large range of the influence upon the occurrence of a fault, and a technology detecting the fault and performing a system switching for each system has been developed.

For example, in Patent Literature 1, the technology below is disclosed.

A first OS performing a normal task and a second OS that differs from the first OS are provided, and the second OS captures the sign of a fault by analyzing the content of information held in the first OS.

Then, the second OS makes the process of the first OS to be taken over by the other computer by conveying the analyzed content to the other computer.

Further, for example, in the Patent Literature 2, the technology below is disclosed.

A monitoring means to monitor an execution state of a program operating on a first OS is provided, and when the sign of a fault is detected, the monitoring means notifies a logical computer management means operating on a second OS.

Then, the logical computer management means enables the process to continue by newly activating a third OS which takes over the process of the first OS.

Further, in Patent Literature 3, the technology below is disclosed.

A multi-system computer collecting virtual computers which corresponds to a plurality of single system computers is prepared, and when a fault occurs in any of the single system computers, one of the virtual computers on the multi-system computer realizes continuous processing by taking over the process.

On the other hand, for a system switching apparatus provided against a fault of a system which controls physical equipment such as a motor and the like, the technology below exists.

In order to prevent an unstable control caused by emitting control signals from a plurality of systems, the system switching apparatus performs an exclusive control so that, among an active system actually controlling the equipment and a standby system provided against the fault, only the active system can output the control signal.

For example, in Patent Literature 4, the technology below is disclosed.

A unit transmitting a control signal to an actuator is duplexed, and a master-slave selective module installed outside of the units determines states of an active system unit and a standby system unit at high speed When the active system unit is abnormal, the normal standby system unit is switched to become an active system, and only the active system outputs the control signal. Then, both systems receive a response to the control signal.

CITATION LIST

Patent Literature

Patent Literature 1: JP 2005-115751 A
Patent Literature 2: JP 2004-30363 A
Patent Literature 3: JP 2013-37433 A
Patent Literature 4: JP 2005-56241 A

SUMMARY OF INVENTION

Technical Problem

In a single system computer in which one system operates on one computer, when a fault occurs in the system of the single system computer (for example, when a failure occurs in one of interface apparatuses), a system switching becomes necessary.

In the single system computer, when the system switching is performed, outputs of all devices connected to the single system computer can be stopped.

Therefore, the system switching is performed by invalidating outputs of all devices of the single system computer and validating outputs of all devices of a standby system computer.

In a multi-system computer in which a plurality of systems are operated, each system controls equal to or more than one device.

When a switching method in the single system computer as described above is applied to the multi-system computer, not only an interface apparatus controlled by the system in which the fault occurred, but also an interface apparatus controlled by the other system are made invalid, the other system being unrelated to the system in which the fault occurred and not being influenced from the fault.

Therefore, it is necessary to perform the system switching of all systems on the multi-system computer.

Accordingly, there is a problem that, by the occurrence of an unnecessary system switching, deterioration in performance, deterioration in redundancy, and the like are occurred.

The present invention mainly aims to solve the problem as above. The primary purpose of the present invention is to enable the system switching for each data processing system in the multi-system computer.

Solution to Problem

A computer apparatus according to the present invention includes a plurality of data processing systems each of which is associated with one of a plurality of devices and performs data processing by communicating with an associated device which is associated, and the computer apparatus includes:

a determination unit to determine, for each data processing system, depending on a state of each data processing system, whether or not a communication between each data processing system and its associated device is permitted; and a communication control unit to control, for each data processing system, in accordance with a determination result of the determination unit, the communication between each data processing system and its associated device.

Advantageous Effects of Invention

In the present invention, depending on a state of each data processing system, a communication with an associated device can be controlled for each data processing system.

Therefore, only the communication between the data processing system in which the fault occurred and its associated device can be stopped, and the system switching limited to the data processing system in which the fault occurred is possible.

BRIEF DESCRIPTION OF DRAWINGS

FIG. 2 is a diagram illustrating an example of an entry notification according to the first embodiment.

FIG. 3 is a diagram illustrating an example of a state change notification according to the first embodiment.

DESCRIPTION OF EMBODIMENT

Embodiment 1.

In the present embodiment, a configuration which enables a system switching limited to an individual system in a multi-system computer will be described.

Figure 1:
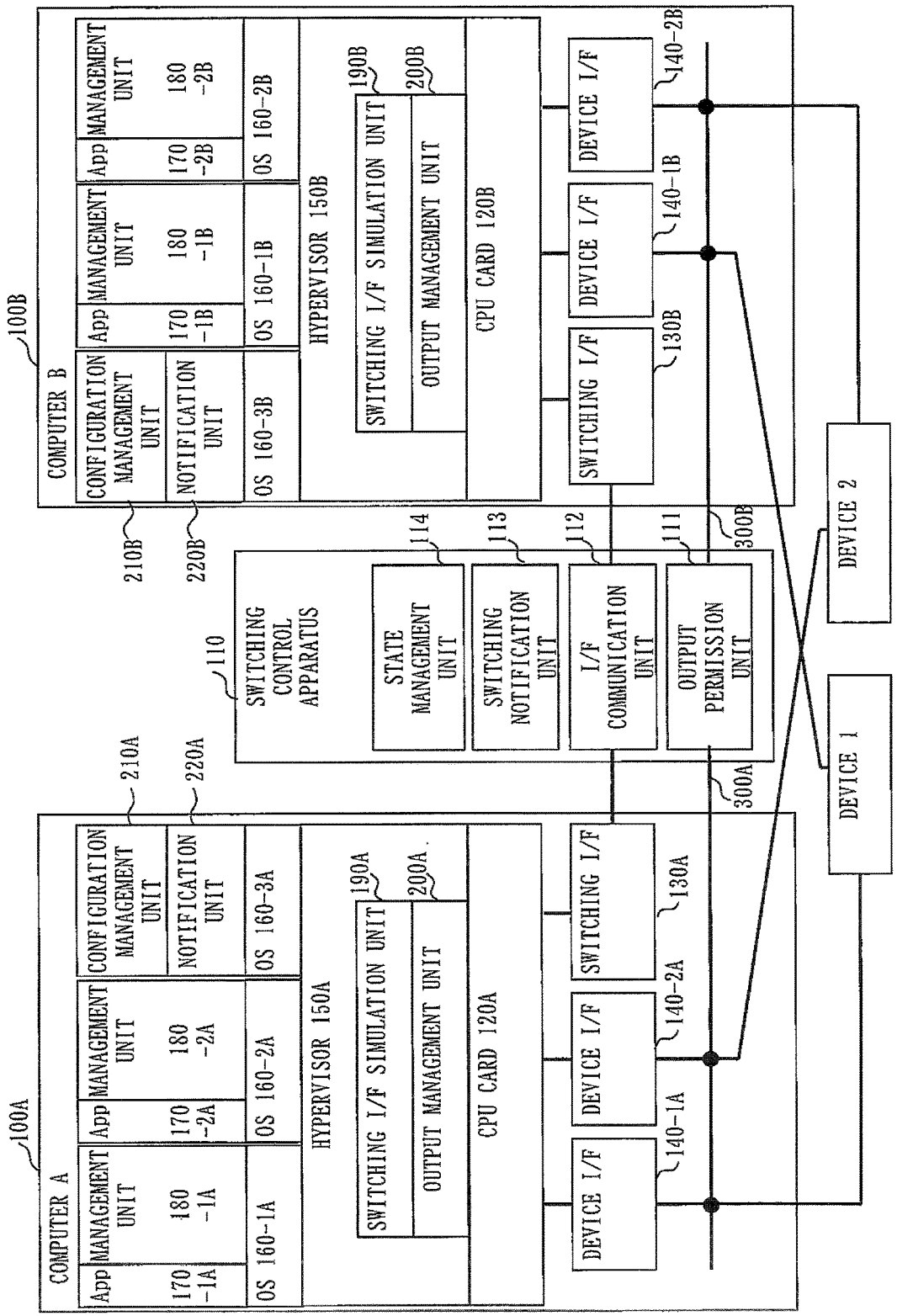
FIG. 1 is a diagram illustrating an overall configuration example of a computer mechanism according to a first embodiment.

FIG. 1 is a diagram illustrating a computer mechanism according to the present embodiment.

The computer mechanism illustrated in FIG. 1 is configured with a computer apparatus A 100A and a computer apparatus B 100B being multi-system computers, and a switching control apparatus 110.

In FIG. 1, redundancy is enhanced by the computer apparatus A 100A and the computer apparatus B 100B.

Note that, hereinafter, the computer apparatus A 100A is also referred to as a computer A 100A, and the computer apparatus B 100B is also referred to as a computer B 100B.

Further, when the computer apparatus A 100A and the computer apparatus B 100B are not required to be distinguished, as an expression to indicate the two apparatuses, it is expressed as a computer 100.

In FIG. 1, the computer A 100A and the computer B 100B are connected via the switching control apparatus 110.

Further, a device 1 and a device 2 being devices controlled by each computer 100 are connected to both computers 100.

The device 1 and the device 2 are, for example, motors.

In each computer 100, a CPU card 120 mounting a CPU exists, and a software on the CPU card 120 communicates with the switching control apparatus 110 via a switching I/F (interface) 130.

Further, a device I/F 140 being an interface card to control the device is connected to the CPU card 120.

On the CPU card 120, a hypervisor 150 which executes a plurality of OSs on one CPU card 120 is executed.

On the hypervisor 150, a plurality of OSs 160 are operated.

On the OS 160, an application 170 and a management unit 180 are operated. The application 170 controls the device and the management unit 180 determines the propriety of a continuous process from the state of the device and the state of the OS.

A data processing system is configured with the OS 160, the application 170, and the management unit 180.

That is, the computer A 100A includes, a data processing system configured with an OS 160-1A, an application 170-1A, and a management unit 180-1A, and a data processing system configured with an OS 160-2A, an application 170-2A, and a management unit 180-2A.

Further, the computer B 100B includes, a data processing system configured with an OS 160-1B, an application 170-1B, and a management unit 180-1B, and a data processing system configured with an OS 160-2B, an application 170-2B, and a management unit 180-2B.

The data processing system configured with the OS 160-1A, the application 170-1A, and the management unit 180-1A of the computer A 100A, and the data processing system configured with the OS 160-1B, the application 170-1B, and the management unit 180-1B of the computer B 100B are hereinafter referred to as a system ABC.

The system ABC is made redundant by the computer A 100A and the computer B 100B as described.

The system ABC performs a predetermined data processing by communicating with the device 1.

The device 1 used by the system ABC is referred to as an associated device of the system ABC.

Further, the data processing system configured with the OS 160-2A, the application 170-2A, and the management unit 180-2A of the computer A 100A, and the data processing system configured with the OS 160-2B, the application 170-2B, and the management unit 180-2B of the computer B 100B are hereinafter referred to as a system DEF.

The system DEF is made redundant by the computer A 100A and the computer B 100B as described.

The system DEF performs a predetermined data processing by communicating with the device 2.

The device 2 used by the system DEF is referred to as an associated device of the system DEF.

The hypervisor 150 includes a switching I/F simulation unit 190 to simulate a switching I/F towards each OS 160 and an output management unit 200 to control an output from the OS 160 to the device I/F 140.

More specifically, the output management unit 200 determines, for each data processing system, depending on the state of the data processing system, whether or not a communication between the data processing system and the associated device is permitted.

For example, if a fault occurs in the system ABC (OS 160-1A, application 170-1A, and management unit 180-1A) of the computer A 100A, an output management unit 200A decides to prohibit a communication between the system ABC of the computer A 100A and the device 1.

Then, the output management unit 200 controls the communication between the data processing system and the device in accordance with a determination result.

When permitting the communication between the system ABC of the computer A 100A and the device 1, the output management unit 200A enables the system ABC of the computer A 100A to communicate with the device 1 by transferring a signal from the system ABC of the computer A 100A to the device 1 to a device I/F 140-1A.

On the other hand, when prohibiting the communication between the system ABC of the computer A 100A and the device 1, the output management unit 200 A disenables the system ABC of the computer A 100A to communicate with the device 1 by discarding the signal from the system ABC of the computer A 100A to the device 1.

The output management unit 200 corresponds to an example of a determination unit and a communication control unit.

One OS 160 on the computer 100 operates as a system to control the system switching.

Specifically, an OS 160-3A is an OS for the system switching in the computer A 100A, and an OS 160-3B is an OS for the system switching in the computer B 100B.

On the OS 160-3A (OS 160-3B), a configuration management unit 210A (configuration management unit 210B) and a notification unit 220A (notification unit 220B) are executed. The configuration management unite 210A (configuration management unit 210B) manages the association between the device I/F 140 and the OS 160, and the notification unit 220A (notification unit 220B) communicates with the switching control apparatus 110 by controlling a switching I/F 130A (switching I/F 130B).

In the switching control apparatus 110, an output permission unit 111 controls the propriety of an output of an output permission signal described below for each computer 100.

The output permission unit 111 corresponds to an example of a permission signal output unit.

An OF communication unit 112 communicates with the switching I/F 130 of the computer 100.

The I/F communication unit 112 corresponds to an example of an activation detection unit.

A switching notification unit 113 transmits the switching content to a configuration management unit 210 of the computer 100.

The switching notification unit 113 corresponds to an example of an operation instruction unit.

A state management unit 114 manages the operating condition of each system and device on each computer 100.

The state management unit 114 corresponds to an example of an alternative selection unit.

An output permission signal line 300 connects the output permission unit 111 and each device I/F 140, and the output permission unit 111 sends out the output permission signal being a signal which penults a signal output from the device I/F 140 to the device to the output permission signal line 300.

When the output permission signal is sent out from the output permission unit 111, the output of the device I/F 140 reaches the device.

The output permission signal line 300 is set by hardware logic not to transmit the output permission signal when the switching control apparatus 110 is not operated.

In each computer 100, only when a signal output from the system to the device is permitted by the output management unit 200, a signal from the system is transferred from the output management unit 200 to the device I/F 140, and the output permission signal is output from the output permission unit 111, the signal is transmitted from the device I/F 140 to the device.

Note that, in FIG. 1, a duplex system is indicated in which two computers are connected, but it may be a N-multiplex system in which N (N≥3) computers are connected.

Next, the outline of the operation in the configuration of FIG. 1 will be described.

At the initial state before both computers 100 are operated, the output permission unit 111 of the switching control apparatus 110 does not output the output permission signal to both computers 100 (output to the device is prohibited in both computers 100).

Further, the output management unit 200 of the hypervisor 150 of each computer 100 is also activated with the setting to prohibit the output of each device.

When the computer A 100A is activated, and a hypervisor 150A and a system switching diagnostic system (OS 160-3A, configuration management unit 210A, notification unit 220A) on the computer A 100A are turned to states capable of operating, the configuration management unit 210A transmits an entry notification describing the system configuration of the computer A 100A from the switching I/F 130A towards the I/F communication unit 112 of the switching control apparatus 110 by using the notification unit 220A.

FIG. 2 is an example of the entry notification.

The entry notification includes, at least, a computer ID (Identifier) F100 to uniquely specify the computer 100, a number of systems F110 in the computer 100, and a system ID F120 to specify the system in the computer 100.

In an example of FIG. 2, it is illustrated that the system ABC and the system DEF are operated on the computer A 100A.

Further, the degree of redundancy of each system (duplex system, triplex system) of each system can be defined by collecting this entry notification from all computers to the switching control apparatus 110.

For example, in the example of FIG. 2, the system ABC is the triplex system, and the system DEF and a system GHI are duplex systems.

Note that, in examples of FIG. 2 and FIG. 3 described below, a configuration in which the computer A to the computer C are connected to the switching control apparatus 110 is premised.

After activating the hypervisor 150, the system (in FIG. 1, for example, OS 160-1A, application 170-1A, management unit 180-1A) including the application which controls the device is activated.

The management unit 180-1A handles a switching I/F simulation unit 190A of the hypervisor 150A and notifies the configuration management unit 210A of the normal activation of the system.

The configuration management unit 210A transmits a state change notification of the system to the switching control apparatus 110 by using the notification unit 220A.

FIG. 3 is an example of the state change notification.

The state change notification includes, at least, a computer ID F200 being an identifier of the computer, a number of notification systems F210 indicating a number of systems the change of the state of which the state change notification notifies of, and a system state F220 indicating the state of each system.

The system state F220 includes, at least, a system ID F221 and a state F222.

The computer ID F200 and the system ID F221 used herein adopt the same value used in the entry notification upon activation of the computer.

The system the state of which has not been changed may not be included in the state change notification.

The possible states of the system are an active state, a standby state, and an abnormal state.

The active state is a state in which the system is operated as an active system.

The standby state is a state in which the system is standing by as a standby system.

The abnormal state is a state in which an abnormality occurs in the system.

The state immediately after activating the system is the standby state when the system is activated normally or the abnormal state when the abnormality is detected and the system becomes inoperative.

As described below, each system does not perform the operation of the active state until receiving an instruction to shift to the active state, from the switching I/F simulation unit 190A.

The switching control apparatus 110 interprets the message received through in the I/F communication unit 112 and registers the system configuration and the state of the computer 100 to the state management unit 114.

The I/F communication unit 112, at the time point of receiving the entry notification from the computer A 100A, causes the output permission unit 111 to send out the output permission signal to an output permission signal line 300A on the computer A 100A side.

Next, the state management unit 114 checks an operating state of each system in each computer 100 and decides on a system basis that one of the systems is the active system and the other is the standby system.

The state management unit 114 transmits a system decision notification to each computer 100 by using the switching notification unit 113.

The switching notification unit 113 transmits the system decision notification to the configuration management unit 210 of each computer 100 via the I/F communication unit 112.

Figure 4:
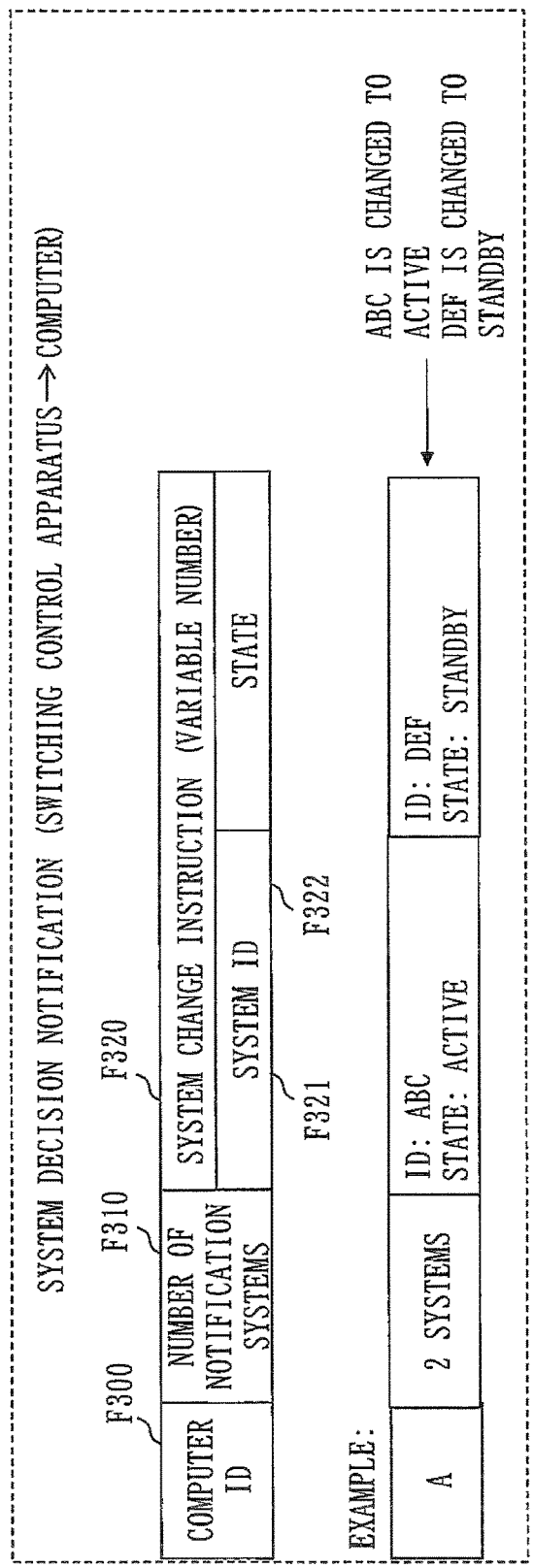
FIG. 4 is a diagram illustrating an example of a system decision notification according to the first embodiment.

FIG. 4 is an example of the system decision notification.

The system decision notification includes, at least, a computer ID F300 being an identifier of the computer, a number of notification systems F310 indicating a number of systems which are subject of the notification of the system decision notification, and a system change instruction F320 to each system.

The system change instruction F320 includes, at least, a system ID F321 and a state F222 indicating the state after change.

In the computer A 100A, the configuration management unit 210A which has received the system decision notification changes the setting of the output management unit 200 A by following the notification content.

Namely, if the corresponding system is in the active state, the configuration management unit 210A performs the setting to the output management unit 200A, the setting permitting the signal output from the corresponding system to the associated device.

Further, if the corresponding system is in the standby state, the configuration management unit 210A performs the setting to the output management unit 200A, the setting prohibiting the signal output from the corresponding system to the associated device.

Further, the configuration management unit 210A notifies the management unit 180 of the corresponding system of the system switching via the switching I/F simulation unit 190A.

For example, when the management unit 180-1A receives the change notification to the active system, the management unit 180-1A changes an operation mode of the application 170-1A, and the application 170-1A performs an operation switching to a normal running state.

The above is the operation of the computer 100 upon activation.

Next, an operation outline when a failure occurs in the system ABC (system configured with the OS 160-IB, the application 170-1B, and the management unit 180-1B) of the computer B 100B will be described using FIG. 1.

Here, it is assumed that the failure in the system ABC of the computer B 100 B has occurred due to a fault of the device I/F 140-1B.

Further, it is assumed that the system ABC of the computer B 100B is the active system and the system ABC of the computer A 100A is the standby system.

The application 170-1B of the computer B 100B detects an abnormality of the device I/F 140-1B and notifies the management unit 180-1B of the detection of the abnormality.

When the management unit 180-1B evaluates the degree of influence of the failure and determines that the operation is incapable of continuing, the management unit 180-1B handles the switching I/F simulation unit 190A and notifies the configuration management unit 210A that the process becomes incapable of continuing.

The configuration management unit 210A uses the notification unit 220A and transmits the state change notification to the switching control apparatus 110.

The switching control apparatus 110 having received the state change notification updates the state management unit 114.

The operation thereafter equals to the above operation upon activation.

That is, the state management unit 114 checks the operating state of each system of each computer 100. Then, the state management unit 114 assigns the system ABC of the computer A 100A not in abnormal state as the active system, and assigns the system ABC of the computer B 100B as the standby system.

The state management unit 114 transmits the system decision notification to each computer 100 by using the switching notification unit 113.

Figure 5:
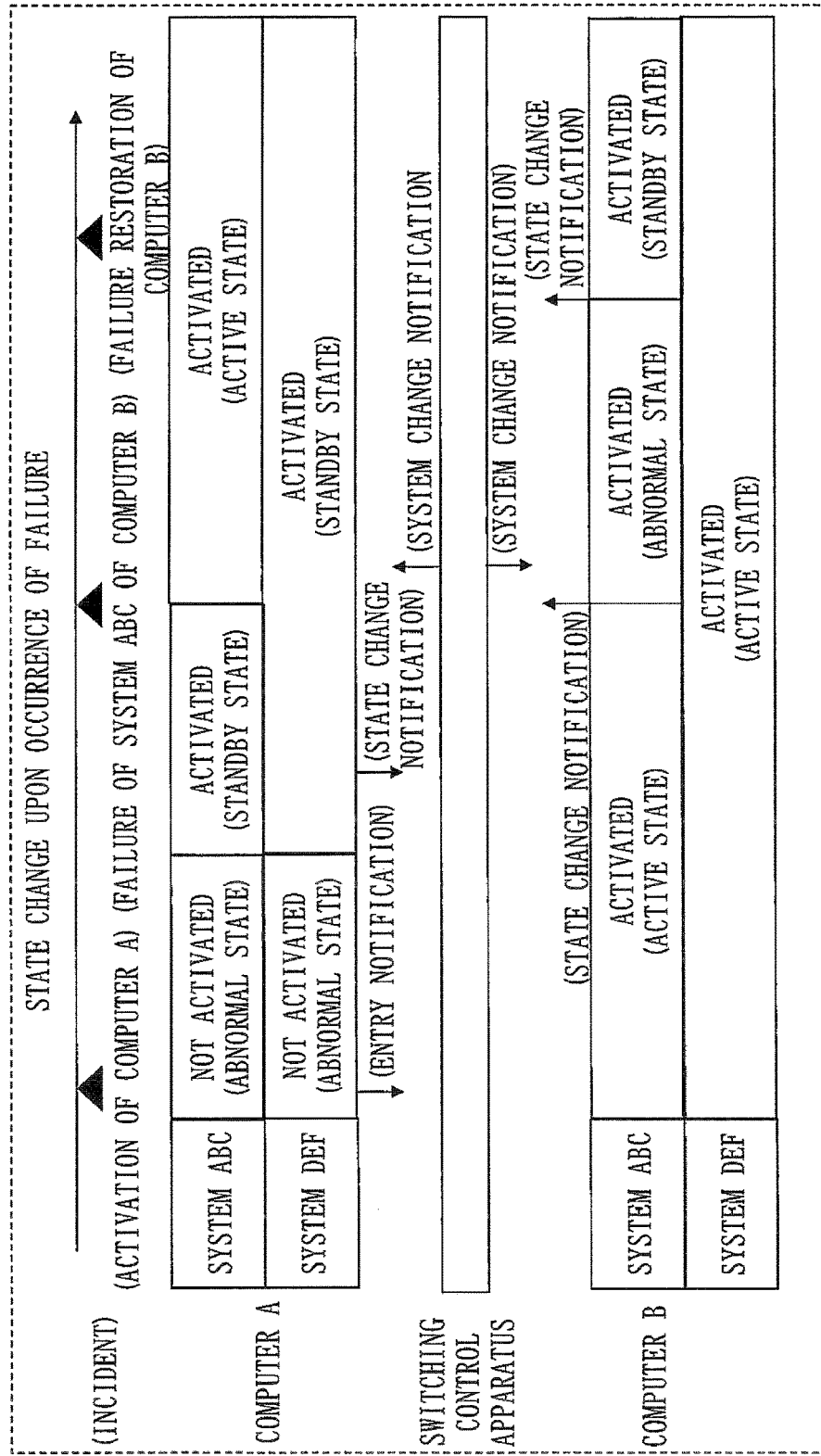
FIG. 5 is a diagram illustrating an example of a state change upon the occurrence of a failure according to the first embodiment.

FIG. 5 is an image diagram arranging in time series a state transition of each computer 100 upon the occurrence of a failure.

In FIG. 5, time passes from the left to the right direction. Firstly, the computer B 100B starts an operation with the system ABC and the system DEF operating in active states.

At the time point of activating the computer A 100A, the entry notification is transmitted from the computer A 100A to the switching control apparatus 110.

At this time point, all systems of the computer A 100A are in the abnormal state since all systems are not activated.

Thereafter, the computer A 100A transits to the standby state after activating each system of the computer A 100A and issues the state change notification to the switching control apparatus 110.

Thereafter, when the system ABC of the computer B 100B detects the abnormality, the system ABC of the computer B 100B transits to the abnormal state, and the computer B 100B issues the state change notification to the switching control apparatus 110.

Since the system ABC of the computer A 100A is in the standby state, the switching control apparatus 110 issues the system change notification to make the system ABC of the computer A 100A to the active state.

In the computer A 100A having received the system change notification, the system ABC starts an operation as the active system.

Further, the switching control apparatus 110 also transmits the system change notification to the computer B 100B.

In the computer B 100B having received the system change notification, the system ABC stops an operation.

Thereafter, when the system ABC of the computer B 100B recovers function by replacing the device or reactivating the OS, the system ABC of the computer B 100B transits to the standby state and transmits the system change notification to the switching control apparatus 110.

In an example of FIG. 5, the system ABC of the computer A 100A is in the standby state until receiving from the switching control apparatus 110 the system change notification describing that the system ABC of the computer A 100A is assigned as the active system. Therefore, the output management unit 200A of the computer A 100A controls the system ABC of the computer A 100A so that the system ABC of the computer A 100A is not able to communicate with the device 1.

Then, when receiving the system change notification from the switching control apparatus 110 describing that the system ABC of the computer A 100A is assigned as the active system, the system ABC of the computer A 100A turns to the active state. Therefore, the output management unit 200A of the computer A 100A controls the system ABC of the computer A 100A so that the system ABC of the computer A 100A is able to communicate with the device 1.

On the other hand, in the computer B 100B, the system ABC of the computer B 100B is in the active state until the fault occurs in the system ABC. Therefore, the output management unit 200B of the computer B 100B controls the system ABC of the computer B 100B so that the system ABC of the computer B 100B is able to communicate with the device 1.

Then, when the fault occurs in the system ABC, the system ABC of the computer B 100B turns to the abnormal state. Therefore, the output management unit 200B of the computer B 100B controls the system ABC of the computer B 100B so that the system ABC of the computer B 100B is not able to communicate with the device 1.

Next, the operation upon shutting down the computer will be described.

When operating a shutdown of the computer 100, each system stops due to the shutdown.

At this time, the configuration management unit 210 issues the system change notification to notify the switching control apparatus 110 that the system turns to the abnormal state and carries out the system switching of each system.

Thereafter, in order to cancel a registration of the computer 100 from the state management unit 114, the configuration management unit 210 transmits a removal notification to the switching control apparatus 110.

The I/F communication unit 112 of the switching control apparatus 110 having received the removal notification deletes an entry of the computer 100 from registration information of the state management unit 114, sets the output permission unit 111 and stops transmitting the output permission signal to the computer 100.

Next, the operation conducted when the whole computer 100 is malfunctioned will be described.

The switching control apparatus 110 recognizes whether each computer 100 is operated.

As methods to recognize, there are a method to check whether the switching I/F 130 is energized by monitoring the up-down of an electrical signal of the switching I/F 130, a method in which the state management unit 114 periodically issues a message requesting the issue of the state notification and checks the issue condition of a state notification from the computer 100, and the like.

In the switching control apparatus 110, when the fault of the whole computer 100 is detected by these methods, the switching notification unit 113 switches all systems operating in the computer 100 to the other computer, the state management unit 114 deletes the entry of the computer, and the output permission unit 111 stops transmitting the output permission signal to the computer 100.

Next, an operation flow of the I/F communication unit 112 of the switching control apparatus 110 will be described.

Figure 6:
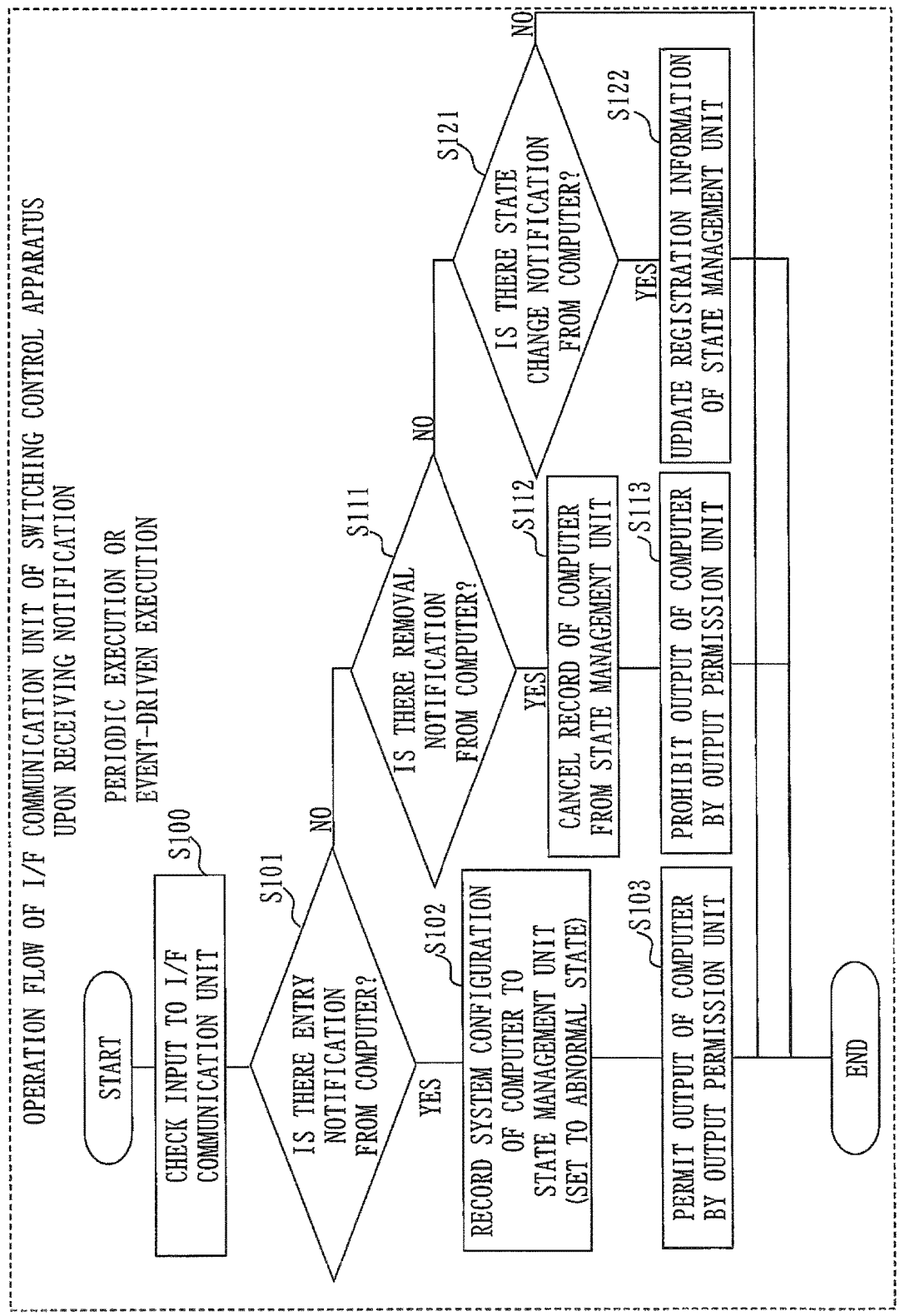
FIG. 6 is a flowchart diagram illustrating an operation example of a switching control apparatus according to the first embodiment.

FIG. 6 is the operation flow where the I/F communication unit 112 of the switching control apparatus 110 receives the notification from the computer 100. S100 is a process to recognize the notification content.

S101, S111, and S121 are processes branching based on the notification content.

In FIG. 6, although S101, S111, and S121 are checked in order, the order may be differed.

The flow of FIG. 6 may be operated periodically or operated by an event-driven.

In S100, the I/F communication unit 112 checks whether or not any notification is received.

When the entry notification is known to be received from the computer 100 (YES in S101), in S102, the I/F communication unit 112 records the system configuration of the computer 100 to the state management unit 114 by following the description of the entry notification.

At this time point, since none of the systems in the computer 100 is activated, the I/F communication unit 112 records the abnormal state as the state of each system to the state management unit 114.

Next, the I/F communication unit 112 operates the setting of the output permission unit 111 and permits the output of the computer 100 in S103.

That is, the I/F communication unit 112 makes the output permission unit 111 to send out the output permission signal.

When the removal notification is known to be received from the computer 100 (NO in S101 and YES in S111), the I/F communication unit 112 cancels the system configuration registration of the computer 100 in the state management unit 114 in S112 and prohibits the output of the computer by performing the setting of the output permission unit 111 in S113.

That is, the I/F communication unit 112 makes the output permission unit 111 to stop transmitting the output permission signal.

When the state change notification is known to be received from the computer 100 (NO in S101, NO in S111, and YES in S121), the I/F communication unit 112 updates the information recoded in the state management unit 114 in S122.

Next, an operation flow of the output management unit 200 of the hypervisor 150 will be described.

Figure 7:
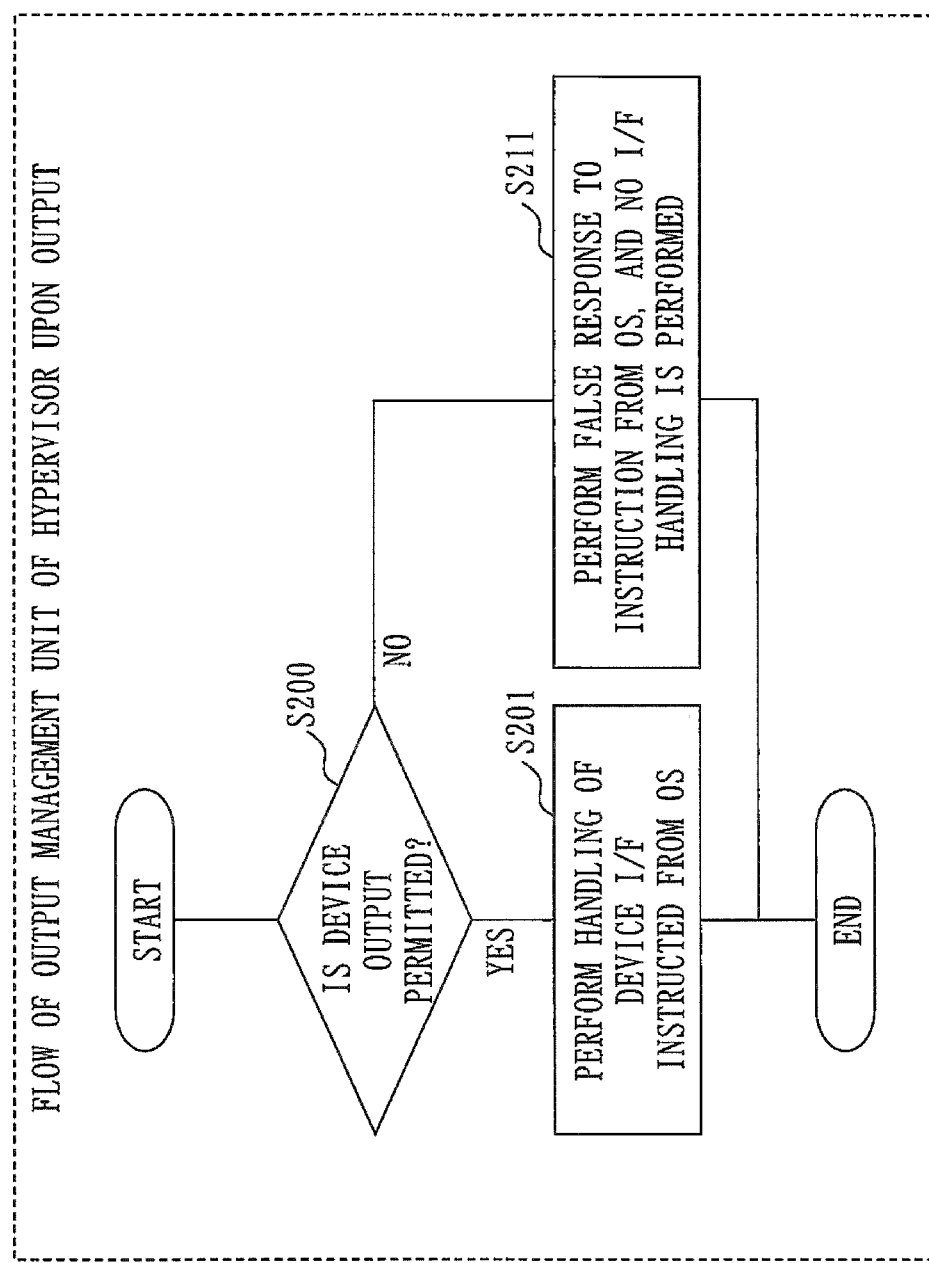
FIG. 7 is a flowchart diagram illustrating an operation example of a hypervisor according to the first embodiment.

FIG. 7 is the operation flow of the output management unit 200 of the hypervisor 150

In the system handling the device, the OS 160 issues a handling request of the device I/F 140 to the hypervisor 150 by following a request form the application 170.

In the handling request, a signal from the OS 160 to the device is included.

The output management unit 200 determines in response to the handling request, in S200, whether the system is permitted to output to the device.

When the system is permitted to output to the device (YES in S200), the output management unit 200 performs handling of the device I/F 140 in response to the request in S201.

That is, the output management unit 200 transfers the signal form the OS 160 to the device to the device I/F 140 and makes the device I/F 140 to transmit the signal to the device.

When the system is in the active state, the output to the device is permitted.

On the other hand, when the system is not permitted to output to the device (NO in S200), the output management unit 200, in S211, returns a false response to the handling request from the OS 160. However, in actually, the output management unit 200 does not handle the device I/F 140 and prevents the output to the device.

That is, the output management unit 200 discards the signal from the OS 160 to the device and transmits a simulation signal which simulates the response signal from the device to the OS 160.

When the system is in the standby state or the abnormal state, the output to the device is prohibited.

An effect of the operation according to the present embodiment above will be described.

In the present embodiment, the hypervisor 150 includes the output management unit 200 and the output management unit 200 controls the propriety of the output from the system to the device I/F 140, based on the determination of the state management unit 114 of the switching control apparatus 110.

Therefore, an effect capable of controlling the output on a system and a device in the computer 100 basis and continuing the operation of the other system even if a part of the systems in the computer 100 is switched, can be obtained.

Further, when a non-permitted output is carried out due to the abnormal operation caused by the OS or the application of the system, only the output of the system can be stopped without influencing on the other system.

Further, in the present embodiment, the switching control apparatus 110 sends out the output permission signal to the output permission signal line 300 via the output permission unit 111. If the output permission signal is not sent out, the signal from each device I/F 140 is not output to the device.

Therefore, it is possible to avoid a situation where signals from a plurality of computers 100 to the same device are sent out, and thereby the behavior of the device does not become unstable, even when the switching control apparatus 110 is malfunctioned.

Further, in the present embodiment, when the hypervisor 150 and a system switching diagnosis system (OS 160-3, configuration management unit 210, notification unit 220) of the computer 100 are activated normally, the switching control apparatus 110 receives the entry notification.

Therefore, it is possible to avoid a situation where the signal is output from the device I/F 140 to the device in a circumstance that the hypervisor 150 and the system switching diagnosis system cannot be activated normally and the system cannot be switched on a system basis, and thereby the behavior of the device does not become unstable.

Further, in the present embodiment, the state management unit 114 determines the system switching on a system of each computer 100 basis.

Therefore, a different computer 100 can have a different system.

Further, an effect capable of obtaining a flexible configuration such as a computer configuration with a variable redundancy to make a system to a duplex system, triplex system, depending on the degree of importance, or the like can be obtained.

Lastly, a hardware configuration example of the computer 100 and the switching control apparatus 110 indicated in the present embodiment will be described with reference to FIG. 8.

The computer 100 and the switching control apparatus 110 are computers, and each component of the computer 100 and the switching control apparatus 110 can be implemented by a program.

As the hardware configuration of the computer 100 and the switching control apparatus 110, an arithmetic device 901, an external storage device 902, a main storage device 903, a communication device 904, and an input/output device 905 are connected to a bus.

The arithmetic device 901 is a CPU card that executes programs.

The external storage device 902 is, for example, a ROM (Read Only Memory), a flash memory, or a hard disk device.

The main storage device 903 is a RAM (Random Access Memory).

The communication device 904 is, for example, a NIC (Network Interface Card).

The input/output device 905 is, for example, a mouse, keyboard, or a display device, or the like.

The programs are usually stored in the external storage device 902 and are loaded into the main storage device 903 to be sequentially read and executed by the arithmetic device 901.

The programs are those which implement functions each described as "unit" illustrated in FIG. 1.

Further, the external storage device 902 also stores the hypervisor and an OS, and at least a part of the hypervisor and the OS is loaded into the main storage device 903. The arithmetic device 901 executes the programs each of which implements the function of "unit" illustrated in FIG. 1, while executing the hypervisor and the OS.

Further, the application is stored in the external storage device 902 and is loaded into the main storage device 903 to be sequentially executed by the arithmetic device 901.

Further, in the description of the present embodiment, information, data, signal values, and variable values indicating the results of the processes described as "evaluate", "determine", "control, "permit", "prohibit", "set", "select", "generate", "update", "receive", and the like are stored as files in the main storage device 903.

Figure 8:
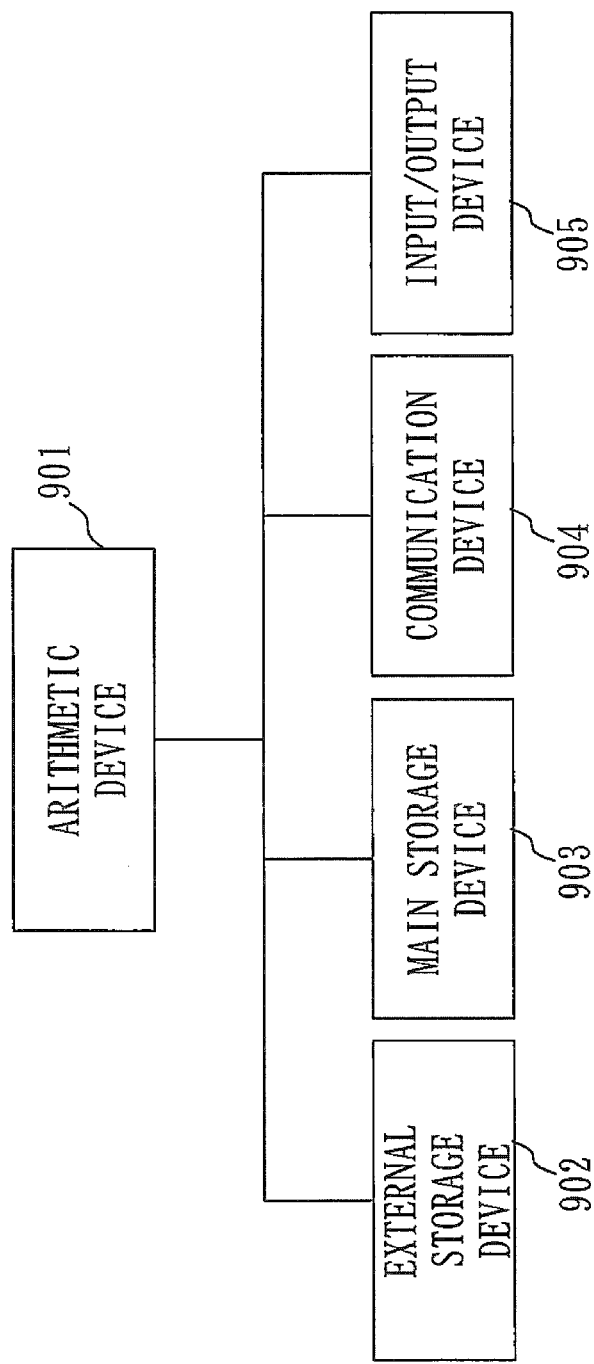
FIG. 8 is a diagram illustrating a hardware configuration example of a computer and the switching control apparatus according to the first embodiment.

Note that the configuration of FIG. 8 merely indicates the hardware configuration example of the computer 100 and the switching control apparatus 110, and the hardware configuration of the computer 100 and the switching control apparatus 110 are not limited to the configuration illustrated in FIG. 8, but can be another configuration.

REFERENCE SIGNS LIST

100: computer apparatus, 110: switching control apparatus, 111: output permission unit, 112: I/F communication unit, 113: switching notification unit, 114: state management unit, 120: CPU card, 130: switching I/F, 140: device I/F, 150: hypervisor, 160: OS, 170: application, 180: management unit, 190: switching I/F simulation unit, 200: output management unit, 210: configuration management unit, 220: notification unit, and 300: output permission signal line.

The invention claimed is:

1. A computer apparatus comprising:
a computer processor coupled with a memory, said memory storing software corresponding to a plurality of data processing systems each of which comprises an operating system and an application that are executable by said computer processor, wherein each of the plurality of data processing systems is associated with one of a plurality of devices and performs data processing by communicating with the associated device, said memory further comprising instructions which, when executed by said computer processor, performs the following process:
  determining, for each data processing system, depending on a state of the data processing system, whether or not a communication between the data processing system and its associated device is permitted; and
  performing a communication control to
    receive a signal transmitted from any of the plurality of data processing systems with its associated device being the intended destination,
    when the data processing system being a transmission source of the received signal is a permission data processing system for which the communication with its associated device is permitted by the determining step, transfer the signal from the permission data processing system to the associated device, and
    when the data processing system being the transmission source of the received signal is a prohibited data processing system for which the communication with its associated device is prohibited by the determining step, discard the signal from the prohibited data processing system, thereby preventing the device from receiving signals from both the prohibited data processing system and a permitted data processing system on a different computer apparatus,
  wherein the computer apparatus and the different computer apparatus are included in a plurality of separate computer apparatuses having a data processing system associated with each device.

2. The computer apparatus according to claim 1, wherein the performed communication control discards the signal from the prohibited data processing system, and transmits a simulation signal which simulates a signal from the associated device to the prohibition data processing system.

3. The computer apparatus according to claim 1, wherein the determining step prohibits the communication between the data processing system in which an abnormality occurs and its associated device.

4. The computer apparatus according to claim 1, wherein the determining step prohibits the communication between the data processing system in a standby state and its associated device.

5. A computer mechanism comprising a plurality of separate computer apparatuses and a management apparatus managing the plurality of separate computer apparatuses,
  each computer apparatus including:
    a computer processor coupled with a memory, said memory storing software corresponding to a plurality of data processing systems each of which comprises an operating system and an application that are executable by said computer processor, wherein each of the plurality of data processing systems is associated with one of a plurality of devices and performs data processing by communicating with the associated device; and
    a plurality of device interfaces connected respectively to the plurality of devices;
  said memory of each computer apparatus further comprising instructions which, when executed by the computer processor of the computer apparatus, performs the following process:
    determining, for each data processing system in the computer processor, depending on a state of the data processing system, whether or not a communication between the data processing system and its associated device is permitted; and
    performing a communication control that controls, for each data processing system in the computer processor, in accordance with the determination result of the determining step, the communication between the data processing system and its associated device,
  the management apparatus communicatively connected to a device interface for each data processing system in each computer apparatus, the management apparatus including a processor programmed to execute the following for each device:
    detecting one of the plurality of separate computer apparatuses whose data processing system, which is associated with the device, is activated; and
    outputting a permission signal to the device interface for the activated data processing system associated with the device of the detected one of the computer apparatuses, said permission signal permitting the communication with the device to the device interface of the computer apparatus detected to have the activated data interface,
  wherein, for each of the data processing systems in the plurality of separate computer apparatuses which do not receive a permission signal from the management apparatus, the device interface of the data processing system is prohibited from communication with the associated device, thereby preventing the device from receiving communications from the associated data processing systems of more than one of the plurality of separate computer apparatuses.

6. The computer mechanism according to claim 5, wherein, in each computer apparatus, the performed communication control includes:
  receiving a signal transmitted from each data processing system within its associated device being the intended destination,
  when the data processing system being a transmission source of the signal is a permission data processing system for which the communication with its associated device is permitted by the determining step, transferring the signal from the permission data processing system to the associated device, and
  when the data processing system being the transmission source of the signal is a prohibition data processing system for which the communication with its associated device is prohibited by the determining step, discarding the signal from the prohibition data processing system.

7. The computer mechanism according to claim 6, wherein, in each computer apparatus,
  each device interface transmits,
  when receiving the signal from the permission data processing system, and the permission signal from the management apparatus from the performed communication control,
  the signal from the permission data processing system to the associated device of the permission data processing system.

8. The computer mechanism according to claim 5, wherein the processor of the management apparatus is further programmed so that,
  when an abnormality occurs in any of data processing systems of any of computer apparatuses, the management apparatus performs the following:

selecting a data processing system which is an alternative to an abnormality occurred data processing system in which the abnormality occurs, as an alternative data processing system, from among the data processing systems included in the remaining ones of the plurality of separate computer apparatuses other than the computer apparatus which includes the abnormality occurred data processing system; and instructing the computer apparatus including the abnormality occurred data processing system to stop an operation of the data processing system in which the abnormality occurred, and instructing the computer apparatus including the alternative data processing system to start an operation of the alternative data processing system.

* * * * *